(12) United States Patent
Cheng et al.

(10) Patent No.: US 11,900,069 B2
(45) Date of Patent: Feb. 13, 2024

(54) TRANSLATION MODEL TRAINING METHOD, SENTENCE TRANSLATION METHOD, DEVICE, AND STORAGE MEDIUM

(71) Applicant: TENCENT TECHNOLOGY (SHENZHEN) COMPANY LIMITED, Shenzhen (CN)

(72) Inventors: Yong Cheng, Shenzhen (CN); Zhaopeng Tu, Shenzhen (CN); Fandong Meng, Shenzhen (CN); Junjie Zhai, Shenzhen (CN); Yang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 814 days.

(21) Appl. No.: 16/987,565

(22) Filed: Aug. 7, 2020

(65) Prior Publication Data

US 2020/0364412 A1 Nov. 19, 2020

Related U.S. Application Data

(63) Continuation of application No. PCT/CN2019/080411, filed on Mar. 29, 2019.

(30) Foreign Application Priority Data

May 10, 2018 (CN) .......................... 201810445783.2

(51) Int. Cl.
*G06F 40/44* (2020.01)
*G06N 3/08* (2023.01)
(Continued)

(52) U.S. Cl.
CPC .......... *G06F 40/44* (2020.01); *G06F 9/30196* (2013.01); *G06F 18/214* (2023.01);
(Continued)

(58) Field of Classification Search
CPC .... G06F 40/211; G06F 40/253; G06F 40/268; G06F 40/284; G06F 40/30; G06F 40/58;
(Continued)

(56) References Cited

U.S. PATENT DOCUMENTS 8,515,736 B1 * 8/2013 Duta ....................... G06F 40/30
704/9
9,201,871 B2 * 12/2015 He ........................... G06F 40/44
(Continued)

FOREIGN PATENT DOCUMENTS

CN 102439596 A 5/2012
CN 105279252 A 1/2016
(Continued)

OTHER PUBLICATIONS

Vilnis et al., Word Representations via Gaussian Embedding, 2015, ICLR 2015, dev.iclr.cc, pp. 1-54 (Year: 2015).*
(Continued)

*Primary Examiner* — Lamont M Spooner
(74) *Attorney, Agent, or Firm* — ANOVA LAW GROUP, PLLC

(57) ABSTRACT

A translation model training method for a computer device includes obtaining a training sample set, the training sample set including a plurality of training samples. Each training sample is a training sample pair having a training input sample in a first language and a training output sample in a second language. The method also includes determining a disturbance sample set corresponding to each training sample in the training sample set, the disturbance sample set comprising at least one disturbance sample, and a semantic
(Continued)

similarity between the disturbance sample and the corresponding training sample being greater than a first preset value; and training an initial translation model by using the plurality of training samples and the disturbance sample set corresponding to each training sample to obtain a target translation model, such that the training output sample remains same for the disturbance sample and the corresponding training sample.

15 Claims, 7 Drawing Sheets

(51) Int. Cl.
　　*G06F 40/40*　　　　(2020.01)
　　*G06F 40/30*　　　　(2020.01)
　　*G06F 9/30*　　　　(2018.01)
　　*G06F 18/214*　　　(2023.01)

(52) U.S. Cl.
　　CPC .............. *G06F 40/30* (2020.01); *G06F 40/40* (2020.01); *G06N 3/08* (2013.01)

(58) Field of Classification Search
　　CPC .......... G06F 40/44; G06F 40/45; G06F 40/47; G06N 3/08
　　See application file for complete search history.

(56) References Cited

U.S. PATENT DOCUMENTS

| | | | |
|---|---|---|---|
| 2010/0299132 | A1 | 11/2010 | Dolan et al. |
| 2012/0296635 | A1* | 11/2012 | Brockett ............... G06F 40/166 704/9 |
| 2014/0379329 | A1* | 12/2014 | Dong ...................... G06F 40/45 704/9 |
| 2014/0379386 | A1* | 12/2014 | Drennan, III .......... G06Q 10/10 705/4 |
| 2015/0269932 | A1* | 9/2015 | Evanini .................... G06F 40/30 704/235 |
| 2016/0147872 | A1* | 5/2016 | Agarwalla .......... G06F 16/3338 707/713 |
| 2016/0350655 | A1* | 12/2016 | Weiss ...................... G06N 3/044 |
| 2017/0083508 | A1* | 3/2017 | Dixon ..................... G06F 40/58 |
| 2017/0220559 | A1* | 8/2017 | Fujiwara ................. G06F 40/51 |
| 2017/0220561 | A1* | 8/2017 | Fujiwara ................. G06F 40/45 |
| 2017/0286376 | A1 | 10/2017 | Mugan |
| 2017/0365252 | A1 | 12/2017 | Jshio et al. |
| 2018/0046618 | A1 | 2/2018 | Lee et al. |
| 2018/0061408 | A1* | 3/2018 | Andreas .................. G10L 15/22 |
| 2018/0121419 | A1* | 5/2018 | Lee ....................... G06F 40/247 |
| 2019/0205733 | A1 | 7/2019 | Ghaeini et al. |
| 2021/0034817 | A1* | 2/2021 | Asao ....................... G06F 40/40 |

FOREIGN PATENT DOCUMENTS

| | | |
|---|---|---|
| CN | 105512679 A | 4/2016 |
| CN | 107438842 A | 12/2017 |
| CN | 107526720 A | 12/2017 |
| CN | 107766577 A | 3/2018 |
| CN | 113761950 A | 12/2021 |
| EP | 3282368 A1 | 2/2018 |
| JP | 2012014270 A | 1/2012 |
| JP | 2012527701 A | 11/2012 |
| JP | 2018055670 A | 4/2018 |
| WO | 2018046412 A1 | 3/2018 |

OTHER PUBLICATIONS

Zhu et al., Sentence-level paraphrasing for machine translation system combination, booktitle={Social Computing: Second International Conference of Young Computer Scientists, Engineers and Educators, ICYCSEE 2016, Harbin, China, Aug. 20-22, 2016, Proceedings, Part I 2}, pp. ={612--620}. (Year: 2016).*
The World Intellectual Property Organization (WIPO) International Search Report for PCT/CN2019/080411 May 28, 2019 6 Pages (including translation).
Anonymous, "Towards Robust Neural Machine Translation," ACL 2018 Submission 1044 10 pages.
Jimmy Lei Ba et al., "Layer normalization," 2016, arXiv preprint arXiv:1607.06450. 14 pages.
Dzmitry Bahdanau et al., "Neural machine translation by jointly learning to align and translate," 2015, In Proceedings of ICLR. 15 pages.
Yonatan Belinkov et al., "Synthetic and natural noise both break neural machine translation," 2018, In Proceedings of ICLR. 13 pages.
Yong Cheng et al,. "Semi-supervised learning for neural machine translation," 2016, In Proceedings of ACL, pp. 1965-1974. 10 pages.
Kyunghyun Cho et al., "Learning phrase representations using RNN encoder-decoder for statistical machine translation," 2014, In Proceedings of EMNLP. 15 pages.
Jonas Gehring et al., "Convolutional sequence to sequence learning," 2017, In Proceedings of ICML. 15 pages.
An Goodfellow et al., "Generative adversarial nets," 2014, In Proceedings of NIPS. 9 pages.
An Goodfellow et al., "Explaining and harnessing adversarial examples," 2015, In Proceedings of ICLR. 11 pages.
Di He et al., "Dual learning for machine translation," 2016, In Proceedings of NIPS. 9 pages.
Kaiming He et al., "Deep residual learning for image recognition," 2016, In Proceedings of CVPR, pp. 770-778. 9 pages.
Geoffrey E Hinton et al., "Improving neural networks by preventing co-adaptation of feature detectors," 2012, arXiv preprint arXiv:1207.0580. 18 pages.
Nal Kalchbrenner et al., "Neural machine translation in linear time," 2016, arXiv preprint arXiv:1610.10099. 9 pages.
Yoon Kim, "Convolutional neural networks for sentence classification," 2014, In Proceedings of EMNLP. 6 pages.
Diederik P Kingma et al., "Adam: A method for stochastic optimization," 2015, In Proceedings of ICLR. 15 pages.
Minh-Thang Luong et al., "Effective approaches to attention-based neural machine translation," 2015, In Proceedings of EMNLP. 11 pages.
Aleksander Madry et al., "Towards deep learning models resistant to adversarial attacks," 2018, In Proceedings of ICLR. 28 pages.
Takeru Miyato et al., "Distributional smoothing with virtual adversarial training," 2016, In Proceedings of ICLR. 12 pages.
Kishore Papineni et al., "BLEU: a method for automatic evaluation of machine translation," 2002, In Proceedings of ACL. 8 pages.
Alec Radford et al., "Unsupervised representation learning with deep convolutional generative adversarial networks," 2015, arXiv preprint arXiv: 1511.06434. 16 pages.
Tim Salimans et al., "Improved techniques for training GANs," 2016, In Proceedings of NIPS. 9 pages.
Rico Sennrich et al., "Improving neural machine translation models with monolingual data," 2016, In Proceedings of ACL. 11 pages.
Rico Sennrich et al., "Neural machine translation of rare words with subword units," 2016, In Proceedings of ACL. 11 pages.
Shiqi Shen et al., "Minimum risk training for neural machine translation," 2016, In Proceedings of ACL. 10 pages.
Ilya Sutskever et al., "Sequence to sequence learning with neural networks," 2014, In Proceddings of NIPS. 9 pages.
Christian Szegedy et al., "Intriguing properties of neural networks," 2014, In Proceedings of ICML. 10 pages.
Ashish Vaswani et al., "Attention is all you need," 2017, In Proceedings of NIPS. 11 pages.
Mingxuan Wang et al., "Deep neural machine translation with linear associative unit," 2017, In Proceedings of ACL. 10 pages.
Lijun Wu et al., "Adversarial neural machine translation," 2017, arXiv preprint arXiv:1704.06933. 16 pages.

(56) References Cited

OTHER PUBLICATIONS

Yonghui Wu et al., "Google's neural machine translation system: Bridging the gap between human and machine translation," 2016, arXiv preprint arXiv:1609.08144. 23 pages.
Z. Yang et al., "Improving Neural Machine Translation with Conditional Sequence Generative Adversarial Nets," 2017, arXiv preprint arXiv:1703.04887. 10 pages.
Jiajun Zhang et al., "Exploiting source-side monolingual data in neural machine translation," 2016, In Proceedings of EMNLP, pp. 1535-1545. 11 pages.
Xiangwen Zhang et al., "Asynchronous Bidirectional Decoding for Neural Machine Translation," 2018, In Proeedings of AAAI, pp. 5698-5705. 8 pages.
Stephan Zheng et al., "Improving the Robustness of Deep Neural Networks via Stability Training," 2016, In Proceedings of CVPR, pp. 4480-4488. 9 pages.
China National Intellectual Property Administration (CNIPA) Office Action 1 for 201810445783.2 Nov. 1, 2022 21 Pages (including translation).
The European Patent Office (EPO) The Extended European Search Report for 19800044.0 dated Jun. 9, 2021 9 Pages.
The Japan Patent Office (JPO) Notification of Reasons for Refusal for Application No. 2020-545261 and Translation Nov. 1, 2021 6 Pages.
Georg Heigold et al., "How Robust Are Character-Based Word Embeddings in Tagging and MT Against Wrod Scramlbing or Randdm Nouse?" arXiv:1704.04441, Apr. 14, 2017 (Apr. 14, 2017). 9 pages.
Yitong Li et al., "Learning Robust Representations of Text," arXiv:1609.06082, Sep. 20, 2016 (Sep. 20, 2016) 7 pages.
Yong Cheng et al., "Towards Robust Neural Machine Translation," arXiv:1805.06130, May 16, 2018 (May 16, 2018). 11 pages.
Ziang Xie et al., "Data Noising as Smoothing in Neural Network Language Models," arXiv:1703.02573, Mar. 7, 2017 (Mar. 17, 2017). 12 pages.
Stephan Zheng et al., "Improving the Robustness of Deep Neural Networks via Stability Training," arXiv:1604.04326, Apr. 15, 2016 (Apr. 15, 2016). 9 pages.
Nicolas Papernot et al., "Crafting Adversarial Input Sequences for Recurrent Neural Networks," arXiv:1604.08275, Apr. 28, 2016 (Apr. 28, 2016). 6 pages.
Masaki Yamauchi et al., "Statistical Machine Translation using Small Parallel corpora based on Automatic Corpora Generation and Feedback," The 30th Annual Conference of the Japanese Society for Artificial Intelligence, Jun. 6, 2016. 4 pages.

* cited by examiner

TRANSLATION MODEL TRAINING METHOD, SENTENCE TRANSLATION METHOD, DEVICE, AND STORAGE MEDIUM

RELATED APPLICATIONS

This application is a continuation application of PCT Patent Application No. PCT/CN2019/080411, filed on Mar. 29, 2019, which claims priority to Chinese Patent Application No. 201810445783.2, filed with the National Intellectual Property Administration, PRC on May 10, 2018 and entitled "TRANSLATION MODEL TRAINING METHOD, SENTENCE TRANSLATION METHOD, DEVICE, AND STORAGE MEDIUM", content of all of which is incorporated herein by reference in its entirety.

FIELD OF THE TECHNOLOGY

The present disclosure relates to the field of computer technologies and, in particular, to a translation model training method, a sentence translation method, a device, and a storage medium.

BACKGROUND OF THE DISCLOSURE

With the development of artificial intelligence, machine translation has been widely used, such as simultaneous interpretation, chat content translation, and the like, which are performed by converting one input language into another output language based on machine translation.

Neural machine translation is a machine translation model entirely based on a neural network. Neural machine translation has reached a good translation level in many language pairs and has been widely used in various machine translation products. However, because the neural machine translation model is based on a complete neural network, the globality of modeling thereof causes each output of a target end to rely on each word inputted by a source end. Consequently, the translation quality is excessively sensitive to a small disturbance in the input. For example, in a translation from Chinese to English, a user enters a Chinese sentence "他们不怕困难 做出围棋AI", and an English translation given by the machine translation model is "They are not afraid of difficulties to make Go AI". However, when the user enters a similar Chinese sentence "他们不畏困难 做出围棋AI", an output of the machine translation has drastically changed, and the result is "They are not afraid to make Go AI". Although the user replaced only one word with a synonym, but the translation result thereof has drastically changed.

That is, the stability of the current neural machine translation, i.e., the robustness, is relatively poor. The disclosed methods and systems are directed to solve one or more problems set forth above and other problems.

SUMMARY

Embodiments of the present disclosure provide a translation model training method, a sentence translation method, a device, and a storage medium, to improve the robustness of machine translation and translation quality of machine translation.

According to one aspect of the present disclosure, a translation model training method is provided for a computer device. The method includes obtaining a training sample set, the training sample set including a plurality of training samples. Each training sample is a training sample pair having a training input sample in a first language and a training output sample in a second language. The method also includes determining a disturbance sample set corresponding to each training sample in the training sample set, the disturbance sample set comprising at least one disturbance sample, and a semantic similarity between the disturbance sample and the corresponding training sample being greater than a first preset value; and training an initial translation model by using the plurality of training samples and the disturbance sample set corresponding to each training sample to obtain a target translation model, such that the training output sample remains same for the disturbance sample and the corresponding training sample having the semantic similarity greater than the first preset value.

According to another aspect of the present disclosure, a computer device is provided for sentence translation. The computer device includes a memory storing computer program instructions; and a processor coupled to the memory. When executing the computer program instructions, the processor is configured to perform: obtaining a training sample set, the training sample set including a plurality of training samples, wherein each training sample is a training sample pair having a training input sample in a first language and a training output sample in a second language; determining a disturbance sample set corresponding to each training sample in the training sample set, the disturbance sample set comprising at least one disturbance sample, and a semantic similarity between the disturbance sample and the corresponding training sample being greater than a first preset value; and training an initial translation model by using the plurality of training samples and the disturbance sample set corresponding to each training sample to obtain a target translation model, such that the training output sample remains same for the disturbance sample and the corresponding training sample having the semantic similarity greater than the first preset value.

According to another aspect of the present disclosure, a non-transitory computer-readable storage medium is provided for storing computer program instructions. The computer program instructions are executable by at least one processor to perform: obtaining a training sample set, the training sample set including a plurality of training samples, wherein each training sample is a training sample pair having a training input sample in a first language and a training output sample in a second language; determining a disturbance sample set corresponding to each training sample in the training sample set, the disturbance sample set comprising at least one disturbance sample, and a semantic similarity between the disturbance sample and the corresponding training sample being greater than a first preset value; and training an initial translation model by using the plurality of training samples and the disturbance sample set corresponding to each training sample to obtain a target translation model, such that the training output sample remains same for the disturbance sample and the corresponding training sample having the semantic similarity greater than the first preset value.

Other aspects of the present disclosure can be understood by those skilled in the art in light of the description, the claims, and the drawings of the present disclosure.

DETAILED DESCRIPTION

The following describes embodiments of the present disclosure with reference to the accompanying drawings. Apparently, the described embodiments are merely some but not all of the embodiments of the present disclosure. A person of ordinary skill in the art may understand that the technical solutions provided in the disclosed embodiments of the present disclosure are also applicable to other technical problems.

The embodiments of the present disclosure provide a translation model training method, which can improve the robustness of machine translation and translation quality of machine translation. The embodiments of the present disclosure further provide a corresponding sentence translation method, a computer device, a terminal device, and a computer-readable storage medium. Detailed descriptions are separately provided below.

With the development of artificial intelligence, the accuracy of machine translation becomes increasingly high, bringing high convenience to users. For example, machine translation is used in many scenarios, such as simultaneous interpretation, text translation, and the like. Machine translation is usually model-based translation, that is, a translation model is pre-trained. The trained translation model can receive a sentence in one language and then convert the sentence into another language for output. At present, neural machine translation is totally based on a machine translation model of a neural network. The translation accuracy is relatively high, but the model has a poor anti-noise capability. Once there is a slight disturbance in an inputted sentence, an outputted sentence is inaccurate. Therefore, the embodiments of the present disclosure provide a translation model training method. When the translation model is trained, various disturbance samples are introduced into the training samples, thereby ensuring that when the trained translation model receives a sentence with disturbance, the sentence with disturbance can also be correctly translated.

In the embodiments of the present disclosure, the disturbance includes noise.

A translation model training process in the embodiments of the present disclosure is described below with reference to the accompanying drawings.

Figure 1:
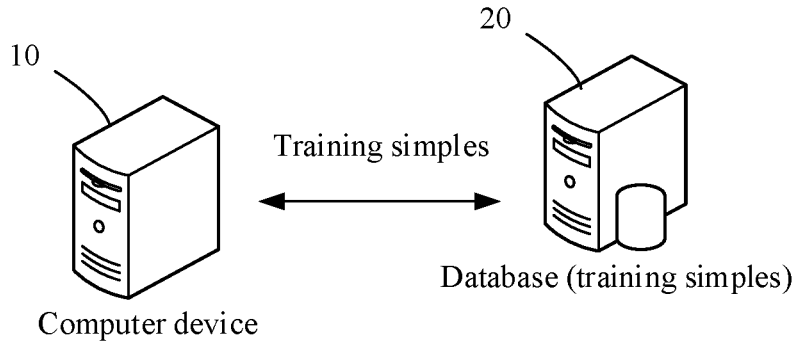
FIG. 1 is a schematic diagram of an embodiment of a translation model training system according to an embodiment of the present disclosure.

FIG. 1 is a schematic diagram of an embodiment of a translation model training system according to an embodiment of the present disclosure. As shown in FIG. 1, the system includes a computer device 10 and a database 20, the database 20 storing training samples.

The computer device 10 obtains a training sample set from the database 20, and then performs translation model training by using the training sample set to obtain a target translation model.

Figure 2:
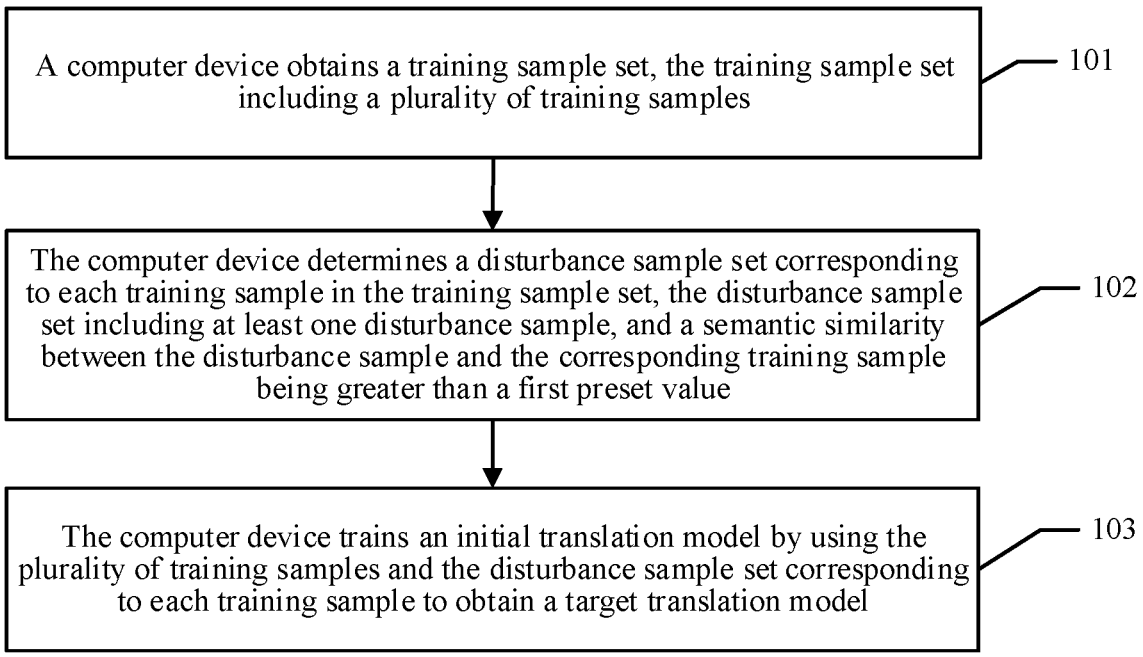
FIG. 2 is a schematic diagram of an embodiment of a translation model training method according to an embodiment of the present disclosure.

Refer to FIG. 2 to understand the model training process. FIG. 2 is a schematic diagram of an embodiment of a translation model training method according to an embodiment of the present disclosure. As shown in FIG. 2, this embodiment of the translation model training method according to an embodiment of the present disclosure includes the followings.

101: The computer device obtains a training sample set, the training sample set including a plurality of training samples. In one embodiment of the present disclosure, the training samples in the training sample set are samples without disturbance.

102: The computer device determines a disturbance sample set corresponding to each training sample in the training sample set, the disturbance sample set including at least one disturbance sample, and a semantic similarity between the disturbance sample and the corresponding training sample being greater than a first preset value.

In one embodiment of the present disclosure, the disturbance sample is a sample that includes disturbance information or noise, but the semantics of the disturbance sample is basically the same as that of the training sample. The disturbance information may be a word having the same meaning but different text, or may be a word that does not significantly change semantics of a sentence in other cases.

The first preset value in one embodiment of the present disclosure may be a specific value, such as 90% or 95%, or the like, which is only an example herein, and does not limit the value of the first preset value that may be set according to a requirement.

A relationship between the training sample and the disturbance sample may be understood with reference to the following example (Chinese to English translation):

a training sample: "他们不怕困难做 出围棋AI"; and a disturbance sample: "他们不畏困难 做出围棋AI".

It can be learned in the foregoing example that, the semantics of the training sample is quite similar to that of the disturbance sample though with different words. For example, the original Chinese word "不怕" is replaced with "不畏".

103: The computer device trains an initial translation model by using the plurality of training samples and the disturbance sample set corresponding to each training sample to obtain a target translation model.

During model training, training is performed by using both the training samples and corresponding disturbance samples.

According to one embodiment of the present disclosure, during translation model training, disturbance samples are used. The semantic similarity between the disturbance sample and the training sample is greater than the first preset value, that is, the semantics of the disturbance sample is quite similar to that of the training sample, so that the target translation model trained in this way, when receiving a sentence with noise, can also perform a correct translation. In this way, the robustness of machine translation and translation quality of machine translation are improved.

Optionally, in another embodiment of the translation model training method, each training sample is a training sample pair, and the training sample pair includes a training input sample and a training output sample.

Correspondingly, the determining, by the computer device, a disturbance sample set corresponding to each training sample may include: determining a disturbance input sample set corresponding to each training input sample, and a disturbance output sample corresponding to a disturbance output sample set, the disturbance input sample set including at least one disturbance input sample, and the disturbance output sample being the same as the training output sample.

Correspondingly, the training, by the computer device, an initial translation model by using the plurality of training samples and the disturbance sample set corresponding to each training sample to obtain a target translation model may include: training the initial translation model by using the plurality of training sample pairs, the disturbance input sample set corresponding to each training input sample, and the disturbance output sample corresponding to the disturbance output sample set to obtain the target translation model.

In one embodiment of the present disclosure, the training input sample is a first language, and the training output sample is a second language. The first language is different from the second language. In one embodiment of the present disclosure, an example in which the first language is Chinese, and the second language is English is used. However, it is not to be construed that Chinese and English constitute a limitation on the translation mode in one embodiment of the present disclosure. The translation mode in one embodiment of the present disclosure may be applicable to translation between any two languages. During training, a translation between the two languages can be implemented, provided that training samples of the corresponding two languages are used.

In one embodiment of the present disclosure, each training input sample may have a plurality of disturbance input samples, but a disturbance output sample corresponding to each disturbance input sample is the same as the training output sample.

Refer to Table 1 to understand a corresponding relationship between the foregoing training input sample, training output sample, disturbance input sample and disturbance output sample.

TABLE 1

| Training input sample | Training output sample | Disturbance input sample | Disturbance output sample |
| --- | --- | --- | --- |
| x | y | x'1<br>x'2<br>x'3<br>. . . | y |

As shown in Table 1, when the training input sample is x, the training output sample is y, a plurality of disturbance input samples that correspond to x are respectively x'1, x'2, x'3, and the like, and the disturbance output sample corresponding to each disturbance input sample is y. In this way, it can be ensured that a translation result outputted by a trained target translation model is y, regardless of whether the inputted sample is x, or x'1, x'2 and x'3. This further ensures the robustness and translation quality of the target translation model.

Certainly, Table 1 is only an example for description. The disturbance input samples corresponding to the training input samples may be more or fewer than those listed in Table 1.

The disturbance input sample is described above, and the following describes generation of the disturbance input sample.

The determining a disturbance input sample set corresponding to each training input sample in the training sample set may include: determining a first word in each training input sample, the first word being a to-be-replaced word; and replacing the first word with at least one second word to obtain the disturbance input sample set, a semantic similarity between the second word and the first word being greater than a second preset value.

In one embodiment of the present disclosure, a sentence with disturbance is generated from the vocabulary level. An inputted sentence is given, a to-be-modified first word therein is then sampled to determine a position of the first word, and then the first word in the position is replaced with a second word in a word list.

The word list includes many words. Refer to the following formula to understand a selection of the second word.

$$P(x \mid x_i) = \frac{\exp(\cos(E[x_i], E[x]))}{\Sigma_{x \setminus x_i} \exp(\cos(E[x_i], E[x]))}$$

$E[x_i]$ is a word vector of the first word $x_i$, and $\cos(E[x_i], E[x])$ measures the similarity between the first word $x_i$ and the second word x. Because a word vector can capture semantic information of a word, in such a replacement method, the first word $x_i$ in the current sentence can be well replaced with a second word x that has similar semantic information.

In another embodiment, the determining a disturbance input sample set corresponding to each training input sample in the training sample set may include: determining a word vector of each word in each training input sample; and superimposing a different Gaussian noise vector on the word vector of each word each time to obtain the disturbance sample set.

In one embodiment of the present disclosure, a sentence with disturbance is generated from a feature level. A sentence is given, so that a vector of each word in the sentence may be obtained. A possible disturbance type is simulated by adding Gaussian noise to the word vector of each word, and this may be understood with reference to the following formula:

$$E[x'_i] = E[x_i] + \varepsilon, \varepsilon \sim N(0, \delta^2 I)$$

The foregoing formula indicates that $E[x_i]$ identifies the word vector of the word $x_i$, $E[x'_i]$ is a word vector of the word obtained after the Gaussian noise is added. The vector $\varepsilon$ is sampled from Gaussian noise in which a variance is $\delta^2$, and $\delta$ is a hyperparameter. Any policy for adding disturbance input may be defined.

The process of generating disturbance input samples is described above, and an architecture of the translation model in one embodiment of the present disclosure is described below.

Figure 3:
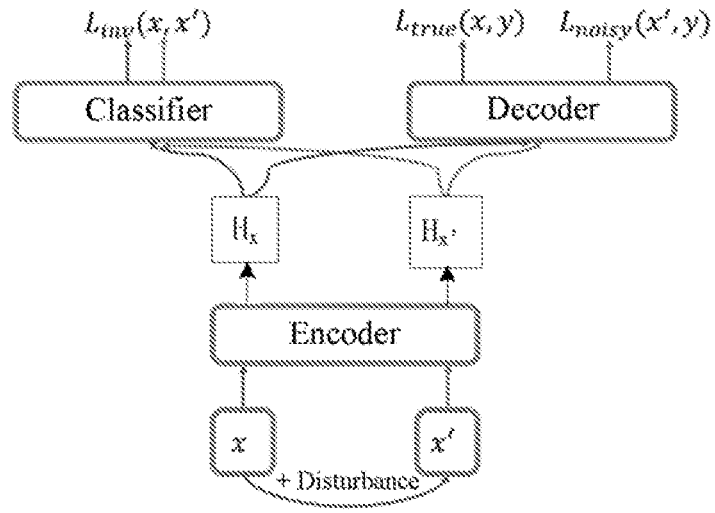
FIG. 3 is a schematic architectural diagram of an initial translation model according to an embodiment of the present disclosure.

FIG. 3 is a schematic architectural diagram of an initial translation model according to an embodiment of the present disclosure. As shown in FIG. 3, the initial translation model includes an encoder, a classifier, and a decoder.

The encoder is configured to receive the training input sample and the corresponding disturbance input sample, and output a first intermediate expressed result and a second intermediate expressed result, the first intermediate expressed result being an intermediate expressed result of the training input samples, and the second intermediate expressed result being an intermediate expressed result of the corresponding disturbance input sample.

The classifier is configured to distinguish the first intermediate expressed result from the second intermediate expressed result.

The decoder is configured to output the training output sample according to the first intermediate expressed result and output the training output sample according to the second intermediate expressed result.

A model target function of the initial translation model includes a classification target function that relates to the classifier and the encoder, and a training target function and a disturbance target function that relate to the encoder and the decoder.

The classification target function includes the training input sample, the corresponding disturbance input sample, parameters of the encoder and parameters of the classifier.

The training target function includes the training input sample, the training output sample, the parameters of the encoder and parameters of the decoder.

The disturbance target function includes the disturbance input sample, the training output sample, the parameters of the encoder and the parameters of the decoder.

In one embodiment of the present disclosure, the training input sample may be represented by x. The corresponding disturbance input sample may be represented by x'. The training output sample and the disturbance output sample may be both represented by y. The first intermediate expressed result may be represented by $H_x$. The second intermediate expressed result may be represented by $H_{x'}$. The classification target function may be represented by $L_{inv}(x, x')$. The training target function may be represented by $L_{true}(x, y)$. The disturbance target function may be represented by $L_{noisy}(x', y)$.

The initial translation model in one embodiment of the present disclosure may be a neural machine translation model.

An objective of training the initial translation model is to enable the initial translation model to maintain translation behaviors of translating x and x' basically the same. The encoder is responsible for converting the sentence x in a first language into $H_x$, and the decoder uses $H_x$ as the input to output a sentence y in a target language. In one embodiment of the present disclosure, a training objective is to train an encoder and a decoder that are not changed by disturbance.

Because x' is a slight change of x, the two have similar semantic information. An input pair (x, x') is given. A training objective of training the translation mode is: (1) it indicates with code that $H_x$ is to be similar to $H_{x'}$ to the greatest extent; and (2) $H_{x'}$ is given, and the decoder is to output the same y. Therefore, in one embodiment of the present disclosure, two training objectives are introduced to enhance the robustness of the encoder and the decoder.

$L_{inv}(x, x')$ is introduced to encourage the encoder to output similar expressions for x and x', so that the encoder not changed by disturbance is implemented, and the objective is achieved through adversarial learning.

$L_{noisy}(x', y)$ is introduced to guide the decoder to generate the target sentence y in a target language for inputted x' with disturbance.

The two newly introduced training objectives can achieve the robustness of the neural machine translation model, so that it can be protected from a drastic change in an output space caused by inputted slight disturbance. In this case, a training objective $L_{true}(x, y)$ in original data x and y is introduced to ensure that translation quality is enhanced while the robustness of the neural machine translation model is increased.

Therefore, the model target function of the initial translation model is:

$$J(\theta) = \sum_{(x,y) \in S} L_{true}(x, y; \theta_{enc}, \theta_{dec}) + \alpha \sum_{x' \in N(x)} L_{inv}(x, x'; \theta_{enc}, \theta_{dis}) + \beta \sum_{x' \in N(x)} L_{noisy}(x', y; \theta_{enc}, \theta_{dec})$$

$\theta_{enc}$ is a parameter of the encoder, $\theta_{dec}$ is a parameter of the decoder, and $\theta_{dis}$ is a parameter of the classifier. The importance between an original translation task and the stability of the machine translation model is controlled by using $\alpha$ and $\beta$.

An objective of the encoder not changed by disturbance is that after a correct sentence x and a corresponding disturbance sentence x' are inputted to the encoder, expressions generated by the encoder for the two sentences are indistinguishable, and this can directly help the decoder to generate robust output. In one embodiment of the present disclosure, the encoder may be used as a generator G, which defines a process of generating an implicit expression $H_x$ sequence. In addition, a classifier D is introduced to distinguish an originally inputted expression $H_x$ from the disturbance input $H_{x'}$. A function of the generator G is to generate similar expressions for x and x', so that the classifier D is incapable of distinguishing $H_x$ from $H_{x'}$, but a function of the classifier is to try to distinguish $H_x$ from $H_{x'}$.

Formally, an adversarial learning objective is defined as:

$$L_{inv}(x,x';\theta_{enc},\theta_{dis}) = E_{x \sim s}[-\log D(G(x))] + E_{x' \sim N(x)}[-\log(1 - D(G(x')))]$$

when an input is given, the classifier outputs a classification value, an objective thereof is to maximize a classification value of a correct sentence x while minimizing a classification value of a disturbance sentence x'.

The model target function $J(\theta)$ is optimized by using stochastic gradient descent. During forward propagation, in addition to a batch of data including x and y, there is also a batch of data including x' and y. Values of $J(\theta)$ can be calculated by using the two batches of data, and then gradients of $J(\theta)$ corresponding to model parameters are calculated. Model parameters are updated by using these gradients. Because an objective of $L_{inv}$ is to maximize the classification value of the correct sentence x while minimizing the classification value of the disturbance sentence x', a gradient of a parameter set $\theta_{enc}$ is multiplied by $-1$ in $L_{inv}$, and the other gradients are propagated normally. In this way, values of $\theta_{enc}$, $\theta_{dec}$ and $\theta_{dis}$ in the initial training model are calculated, thereby training a target translation model having an anti-noise capability.

That is, in one embodiment of the present disclosure, the training the initial translation model by using the plurality of training sample pairs, the disturbance input sample set corresponding to each training input sample, and the disturbance output sample corresponding to the disturbance output sample set to obtain the target translation model includes: inputting each training input sample, the corresponding disturbance input sample, and the corresponding training output sample into the model target function; and optimizing the model target function in a manner of gradient descent to determine parameter values of the encoder, parameter values of the decoder and parameter values of the classifier, a parameter gradient of the encoder in the classification target function being multiplied by −1.

The process of training the target translation model is described above, and a process of sentence translation by using the target translation model is described below.

Figure 4:
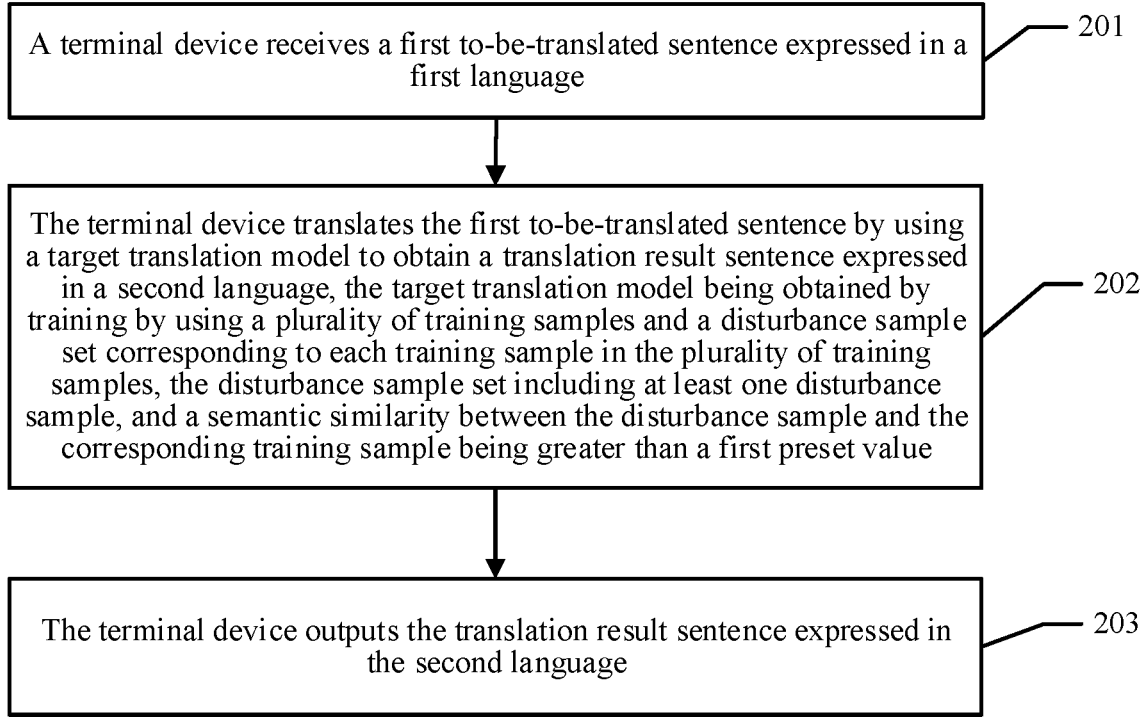
FIG. 4 is a schematic diagram of an embodiment of a sentence translation method according to an embodiment of the present disclosure.

FIG. 4 is a schematic diagram of an embodiment of a sentence translation method according to an embodiment of the present disclosure. As shown in FIG. 4, the embodiment of the sentence translation method according to an embodiment of the present disclosure includes the followings.

201: A terminal device receives a first to-be-translated sentence expressed in a first language.

In one embodiment of the present disclosure, the first language may be any type of language supported by the target translation model.

202: The terminal device translates the first to-be-translated sentence by using a target translation model to obtain a translation result sentence expressed in a second language, the target translation model is obtained by training by using a plurality of training samples and a disturbance sample set corresponding to each training sample in the plurality of training samples, the disturbance sample set including at least one disturbance sample, and a semantic similarity between the disturbance sample and the corresponding training sample being greater than a first preset value. Refer to the embodiment of the foregoing model training process to understand the target translation model, which is not repeated again herein.

203: The terminal device outputs the translation result sentence expressed in the second language.

The second language is different from the first language. For example: the first language is Chinese and the second language is English.

In one embodiment of the present disclosure, because the target translation model has the anti-noise capability, the target translation model can also perform a correct translation when receiving a sentence with noise. In this way, the robustness of machine translation and the translation quality of machine translation are improved.

Optionally, in another embodiment, the sentence translation method may further include: receiving, by the terminal device, a second to-be-translated sentence expressed in the first language, the second to-be-translated sentence being a disturbance sentence of the first to-be-translated sentence, and a similarity between the second to-be-translated sentence and the first to-be-translated sentence being greater than the first preset value; translating, by the terminal device, the second to-be-translated sentence by using the target translation model to obtain the translation result sentence corresponding to the first to-be-translated sentence; and outputting, by the terminal device, the translation result sentence.

In one embodiment of the present disclosure, the first to-be-translated sentence is not limited to the training input samples in the foregoing example, and may be any one of the foregoing disturbance input samples.

Refer to the following scenario examples to understand the sentence translation solution according to an embodiment of the present disclosure.

Figure 5:
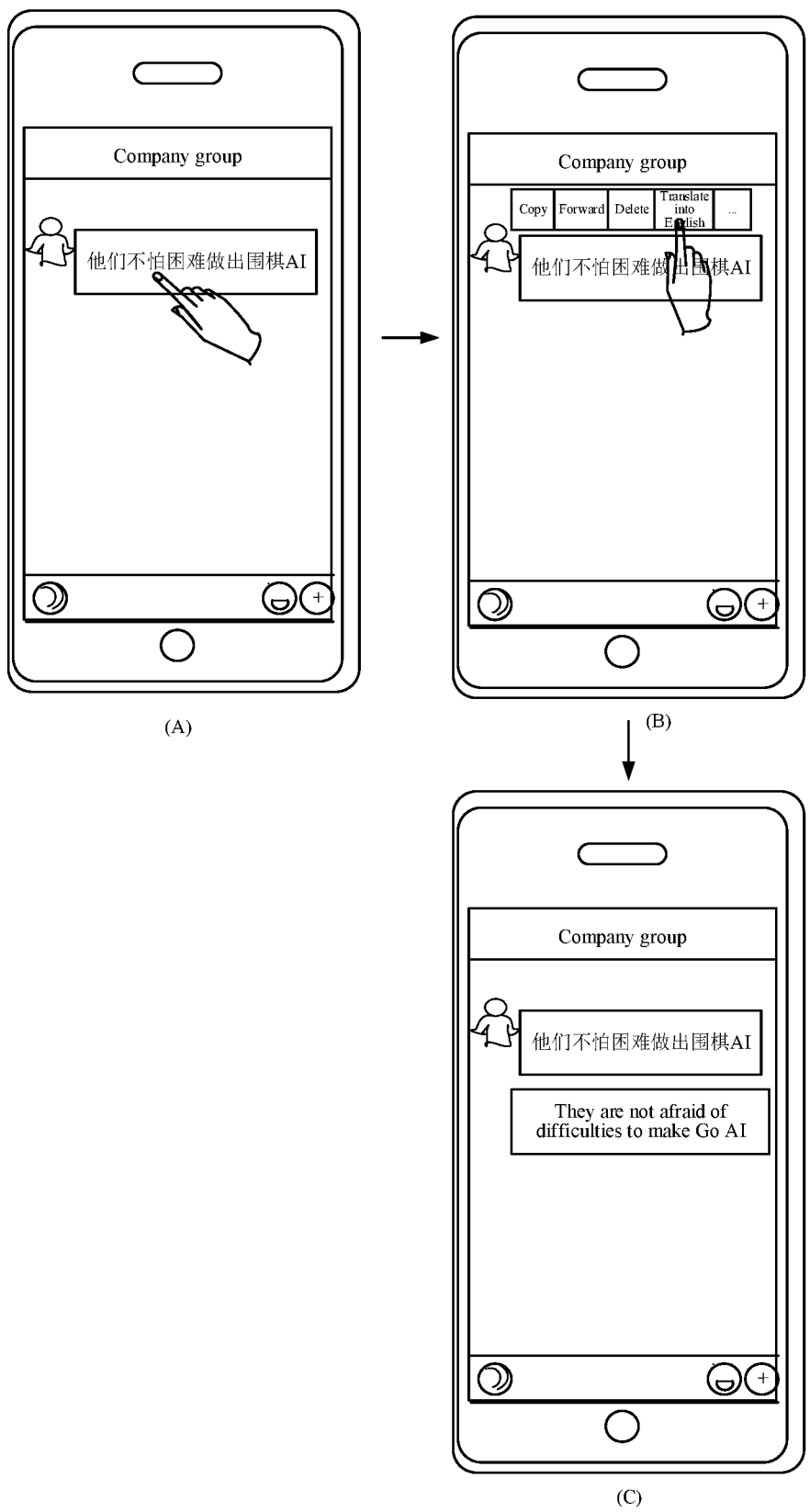
FIG. 5 is a schematic diagram of an application scenario of sentence translation according to an embodiment of the present disclosure.

FIG. 5 is a schematic diagram of an application scenario of sentence translation according to an embodiment of the present disclosure. (A) to (C) in FIG. 5 are exemplary diagrams of a scenario of text translation in a social application according to an embodiment of the present disclosure.

As shown in (A) in FIG. 5, the Chinese sentence "他们不怕困难做出围棋AI" in a social application needs to be translated into English, the text part is touched and held, and then a page shown in (B) in FIG. 5 appears. In the page shown in (B) of FIG. 5, function boxes such as "Copy", "Forward", "Delete", "Translate into English", and the like appear. (B) in FIG. 5 is merely an example. "Translate into English" may alternatively be changed to "translate", and then a drop-down box appears to select corresponding translated text. After a user clicks "Translate into English" on the page shown in (B) of FIG. 5, a translation result "They are not afraid of difficulties to make Go AI" shown in (C) of FIG. 5 appears.

Figure 6:
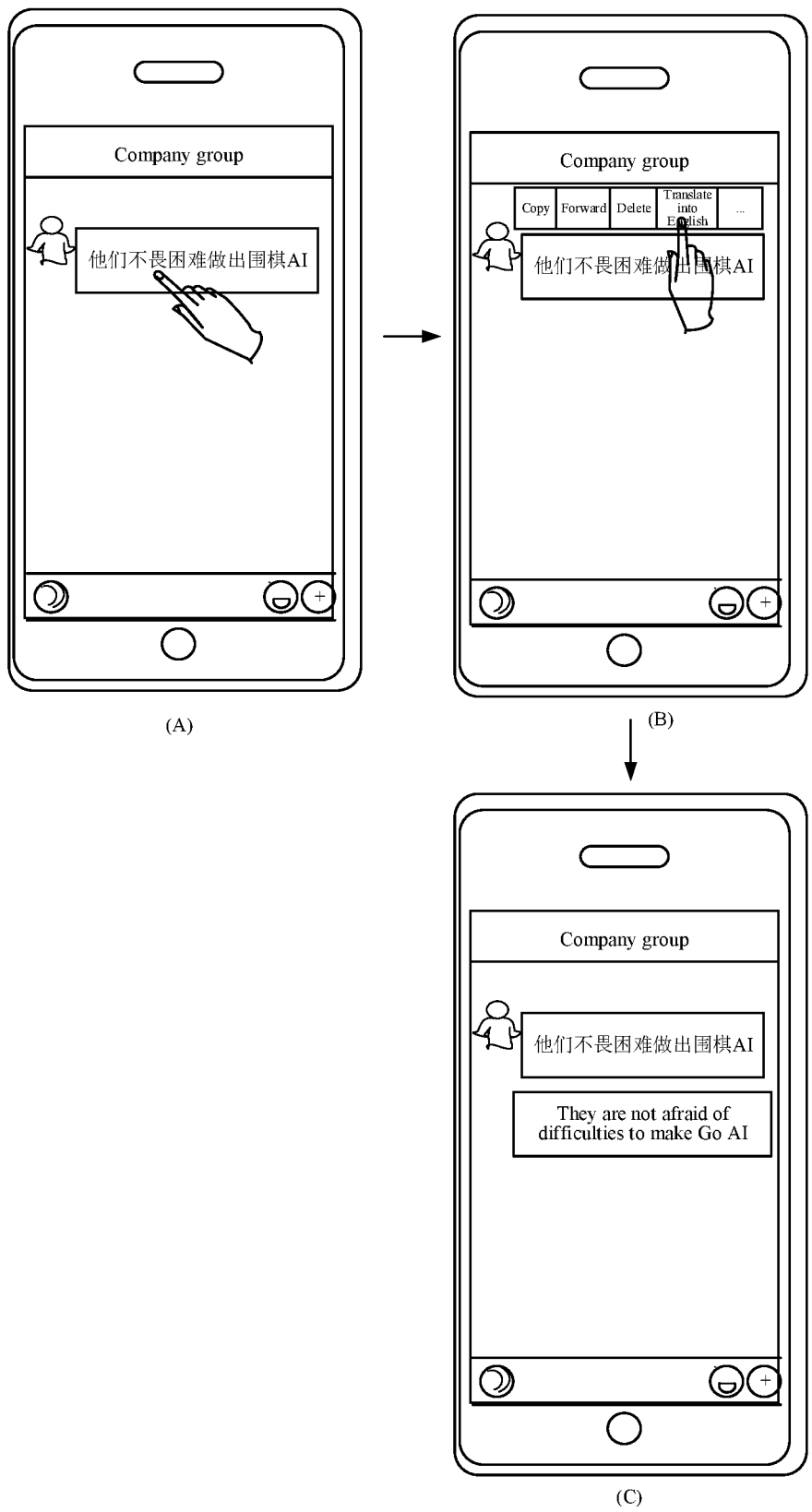
FIG. 6 is a schematic diagram of another application scenario of sentence translation according to an embodiment of the present disclosure.

FIG. 6 is a schematic diagram of another application scenario of sentence translation according to an embodiment of the present disclosure. (A) to (C) in FIG. 6 are exemplary diagrams of another scenario of text translation in a social application according to an embodiment of the present disclosure.

As shown in A of FIG. 6, in a case that "他们不怕困难做出围棋AI" in a social application needs to be translated into English, the text part is touched and held, and then a page shown in (B) in FIG. 6 appears. In the page shown in (B) of FIG. 6, function boxes such as "Copy", "Forward", "Delete", "Translate into English", and the like appear. After a user clicks "Translate into English" on the page shown in (B) of FIG. 6, a translation result "They are not afraid of difficulties to make Go AI" shown in (C) of FIG. 6 appears.

It can be learned from a comparison between the process and result of (A) to (C) in FIG. 5 and those of (A) to (C) in FIG. 6 that, although the to-be-translated sentence in (A) in FIG. 5 is "他们不怕困难做出围棋AI", and the to-be-translated sentence in (A) of FIG. 6 is "他们不惧困难做出围棋AI", for these two semantically similar sentences, in (C) of FIG. 5 and (C) of FIG. 6, the same translation result, that is, "They are not afraid of difficulties to make Go AI" is obtained. It can be learned that the sentence translation solution provided in one embodiment of the present disclosure has better robustness and translation quality.

Figure 7:
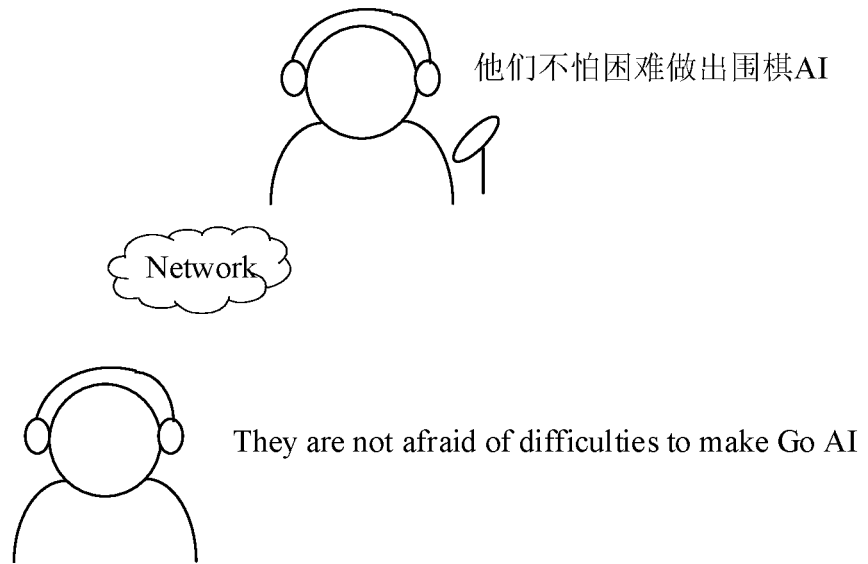
FIG. 7 is a schematic diagram of another application scenario of sentence translation according to an embodiment of the present disclosure.

FIG. 7 is a schematic diagram of application of sentence translation in a simultaneous interpretation scenario according to an embodiment of the present disclosure.

As shown in FIG. 7, in the simultaneous interpretation scenario, a speaker has said "他们不怕困难 做出围棋AI" in Chinese, and a sentence heard by audiences who use English channels is "They are not afraid of difficulties to make Go AI".

Figure 8:
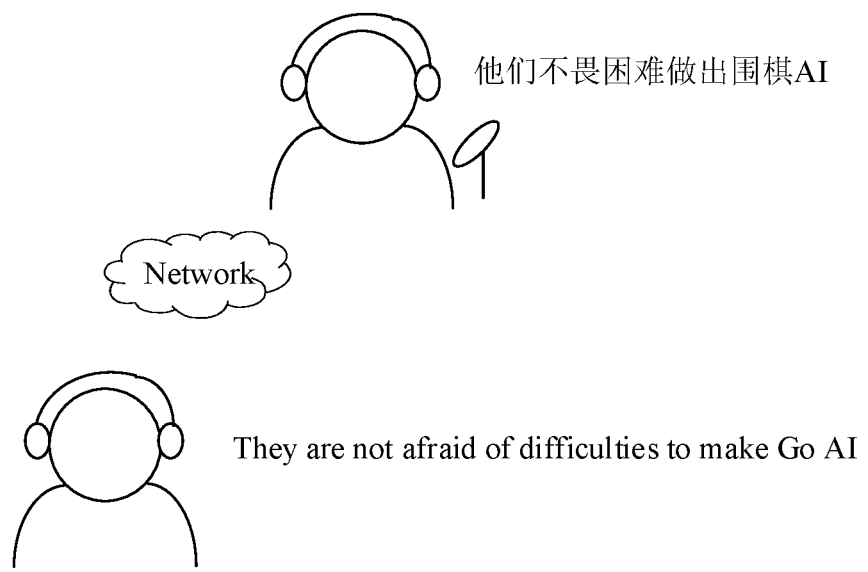
FIG. 8 is a schematic diagram of another application scenario of sentence translation according to an embodiment of the present disclosure.

FIG. 8 is a schematic diagram of another application of sentence translation in a simultaneous interpretation scenario according to an embodiment of the present disclosure.

As shown in FIG. 8, in the simultaneous interpretation scenario, a speaker has said "他们不惧困难 做出围棋AI" in Chinese, and a sentence heard by audiences who use English channels is "They are not afraid of difficulties to make Go AI".

It can be learned from a comparison between the example in FIG. 7 and the example in FIG. 8 that, for semantically similar inputs, the translation results are the same. It can be learned that the sentence translation solution provided in one embodiment of the present disclosure has better robustness and translation quality.

The foregoing two application scenarios are only examples, and the solution of one embodiment of the present disclosure may be used in a plurality of types of translation scenarios, and the form of the terminal device involved is not limited to the forms shown in FIG. 5 to FIG. 8.

The foregoing describes the process of training the target translation model and the process of sentence translation by using the target translation model in the embodiments of the present disclosure. The following describes a translation model training apparatus, a sentence translation apparatus, a computer device, and a terminal device in the embodiments of the present disclosure with reference to the accompanying drawings.

Figure 9:
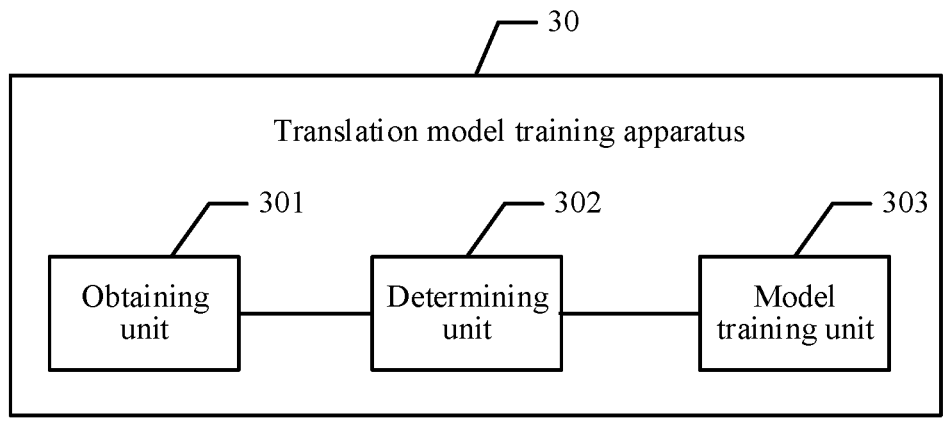
FIG. 9 is a schematic diagram of an embodiment of a translation model training apparatus according to an embodiment of the present disclosure.

FIG. 9 is a schematic diagram of a translation model training apparatus according to an embodiment of the present disclosure. A translation model training apparatus 30 provided in one embodiment of the present disclosure includes one or more processors and one or more memories storing program units. The program units are executed by the processors. As shown in FIG. 9, the program unit includes: an obtaining unit 301, a determining unit 302, and a model training unit 303.

The obtaining unit 301 is configured to obtain a training sample set, the training sample set including a plurality of training samples.

The determining unit 302 is configured to determine a disturbance sample set corresponding to each training sample in the training sample set that is obtained by the obtaining unit 301, the disturbance sample set including at least one disturbance sample, and a semantic similarity between the disturbance sample and the corresponding training sample being greater than a first preset value.

The model training unit 303 is configured to train an initial translation model by using the plurality of training samples that are obtained by the obtaining unit 301 and the disturbance sample set corresponding to each training sample that is determined by the determining unit 302, to obtain a target translation model.

According to one embodiment of the present disclosure, during translation model training, disturbance samples are used. The semantic similarity between the disturbance sample and the training sample is greater than the first preset value, that is, the semantics of the disturbance sample is quite similar to that of the training sample, so that the target translation model trained in this way, when receiving a sentence with noise, can also perform a correct translation. In this way, the robustness of machine translation and the translation quality of machine translation are improved.

Optionally, the determining unit 302 is configured to determine, in a case that each training sample is a training sample pair and the training sample pair includes a training input sample and a training output sample, a disturbance input sample set corresponding to each training input sample, and a disturbance output sample corresponding to a disturbance output sample set, the disturbance input sample set including at least one disturbance input sample, and the disturbance output sample being the same as the training output sample.

The model training unit 303 is configured to train the initial translation model by using the plurality of training sample pairs, the disturbance input sample set corresponding to each training input sample, and the disturbance output sample corresponding to the disturbance output sample set to obtain the target translation model.

Optionally, the determining unit 302 is configured to: determine a first word in each training input sample, the first word being a to-be-replaced word; and replace the first word with at least one second word to obtain the disturbance input sample set, a semantic similarity between the second word and the first word being greater than a second preset value.

Optionally, the determining unit 302 is configured to: determine a word vector of each word in each training input sample; and superimpose a different Gaussian noise vector on the word vector of each word each time to obtain the disturbance sample set.

Optionally, the initial translation model includes an encoder, a classifier and a decoder. The encoder is configured to receive the training input sample and the corresponding disturbance input sample, and output a first intermediate expressed result and a second intermediate expressed result, the first intermediate expressed result being an intermediate expressed result of the training input sample, and the second intermediate expressed result being an intermediate expressed result of the corresponding disturbance input sample. The classifier is configured to distinguish the first intermediate expressed result from the second intermediate expressed result. The decoder is configured to output the training output sample according to the first intermediate expressed result and output the training output sample according to the second intermediate expressed result.

Optionally, a model target function of the initial translation model includes a classification target function that relates to the classifier and the encoder, and a training target function and a disturbance target function that relate to the encoder and the decoder. The classification target function includes the training input samples, the corresponding disturbance input sample, parameters of the encoder and parameters of the classifier. The training target function includes the training input sample, the training output sample, the parameters of the encoder and the parameters of the decoder. The disturbance target function includes the disturbance input sample, the training output sample, the parameters of the encoder and the parameters of the decoder.

Optionally, the model training unit 303 is configured to: input each training input sample, the corresponding disturbance input sample, and the corresponding training output sample into the model target function; and optimize the model target function in a manner of gradient descent to determine parameter values of the encoder, parameter values of the decoder and parameter values of the classifier, a parameter gradient of the encoder in the classification target function being multiplied by −1.

For the translation model training model apparatus 30 provided in the present disclosure, refer to corresponding content of the foregoing method embodiments for understanding, and details are not described herein again.

Figure 10:
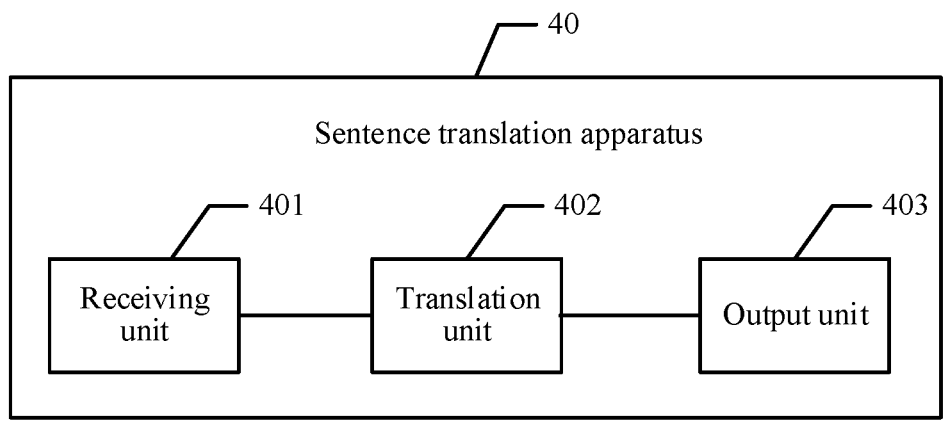
FIG. 10 is a schematic diagram of an embodiment of a sentence translation apparatus according to an embodiment of the present disclosure.

FIG. 10 shows an embodiment of a sentence translation apparatus according to an embodiment of the present disclosure. The apparatus includes one or more processors and one or more memories storing program units, the program units being executed by the processors and including: a receiving unit 401, a translation unit 402, and an output unit 403.

The receiving unit 401 is configured to obtain a first to-be-translated sentence expressed in a first language. The translation unit 402 is configured to translate, by using a target translation model, the first to-be-translated sentence that is received by the receiving unit 401 to obtain a translation result sentence expressed in a second language, the target translation model being obtained by training by using a plurality of training samples and a disturbance sample set corresponding to each training sample in the plurality of training samples, the disturbance sample set including at least one disturbance sample, and a semantic similarity between the disturbance sample and the corresponding training sample being greater than a first preset value. The output unit 403 is configured to output the translation result sentence that is translated by the translation unit 402 and that is expressed in the second language.

In one embodiment of the present disclosure, because the target translation model has the anti-noise capability, the target translation model can also perform a correct translation when receiving a sentence with noise. In this way, the robustness of machine translation and the translation quality of machine translation are improved.

Optionally, the receiving unit 401 is configured to receive a second to-be-translated sentence expressed in the first language, the second to-be-translated sentence being a disturbance sentence of the first to-be-translated sentence, and a similarity between the second to-be-translated sentence and the first to-be-translated sentence being greater than the first preset value. The translation unit 402 is further configured to translate the second to-be-translated sentence by using the target translation model to obtain the translation result sentence corresponding to the first to-be-translated sentence. The output unit 403 is configured to output the translation result sentence.

For the sentence translation apparatus 40, refer to corresponding content of the method embodiments for understanding, and details are not described herein again.

Figure 11:
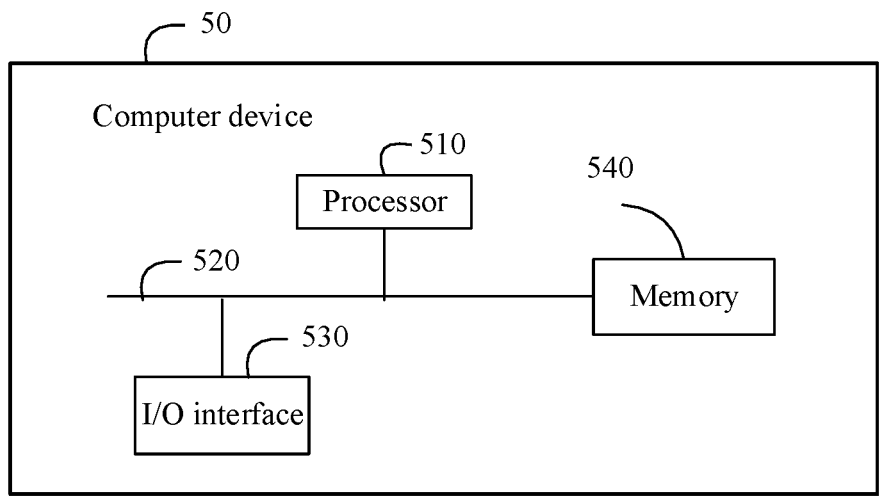
FIG. 11 is a schematic diagram of an embodiment of a computer device according to an embodiment of the present disclosure.

FIG. 11 is a schematic diagram of an embodiment of a computer device according to an embodiment of the present disclosure. As shown in FIG. 11, a computer device 50 includes a processor 510, a memory 540, and an input/output (I/O) interface 530. The memory 540 may include a read-only memory and a random access memory, and provides an operating instruction and data to the processor 510. A part of the memory 540 may further include a non-volatile random access memory (NVRAM).

In some implementations, the memory 540 stores the following elements: an executable module or a data structure, or a subset thereof, or an extension set thereof.

In one embodiment of the present disclosure, in a process of determining ground signs, by calling the operating instruction (the operating instruction may be stored in an operating system) stored in the memory 540, a training sample set is obtained, the training sample set including a plurality of training samples; a disturbance sample set corresponding to each training sample in the training sample set is determined, the disturbance sample set including at least one disturbance sample, and a semantic similarity between the disturbance sample and the corresponding training sample being greater than a first preset value; and an initial translation model is trained by using the plurality of training samples and the disturbance sample set corresponding to each training sample to obtain a target translation model.

According to one embodiment of the present disclosure, during translation model training, disturbance samples are used. The semantic similarity between the disturbance sample and the training sample is greater than the first preset value, that is, the semantics of the disturbance sample is quite similar to that of the training sample, so that the target translation model trained in this way, when receiving a sentence with noise, can also perform a correct translation In this way, the robustness of machine translation and the translation quality of machine translation are improved.

The processor 510 controls an operation of the computer device 50, and the processor 510 may also be referred to as a central processing unit (CPU). The memory 540 may include a read-only memory and a random access memory, and provides an instruction and data for the processor 510. A part of the memory 540 may further include a non-volatile random access memory (NVRAM). During specific application, all components of the computer device 50 are coupled by using a bus system 520, and besides a data bus, the bus system 520 may further include a power source bus, a control bus, a status signal bus, and the like. However, for ease of clear description, all types of buses in the figure are marked as the bus system 520.

The methods disclosed in the foregoing embodiments of the present disclosure may be applied to the processor 510, or may be implemented by the processor 510. The processor 510 may be an integrated circuit chip and has a signal processing capability. During implementation, the steps of the foregoing method may be implemented by using a hardware integrated logic circuit in the processor 510 or implemented by using an instruction in a software form. The processor 510 may be a general-purpose processor, a digital signal processor (DSP), an application-specific integrated circuit (ASIC), a field programmable gate array (FPGA) or another programmable logical device, a discrete gate or transistor logic device, or a discrete hardware component. The processor may implement or perform the methods, the steps and the logical block diagrams that are disclosed in the embodiments of the present disclosure. The general-purpose processor may be a microprocessor or the processor may be any conventional processor or the like. The steps of the methods disclosed with reference to the embodiments of the present disclosure may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 540, and the processor 510 reads information in the memory 540 and completes the steps of the foregoing method in combination with hardware of the processor 510.

Optionally, the processor 510 is configured to: determine, in a case that each training sample is a training sample pair and the training sample pair includes a training input sample and a training output sample, a disturbance input sample set corresponding to each training input sample, and a disturbance output sample corresponding to a disturbance output sample set, the disturbance input sample set including at least one disturbance input sample, and the disturbance output sample being the same as the training output sample; and train the initial translation model by using the plurality of training sample pairs, the disturbance input sample set corresponding to each training input sample, and the disturbance output sample corresponding to the disturbance output sample set to obtain the target translation model.

Optionally, the processor 510 is configured to: determine a first word in each training input sample, the first word being a to-be-replaced word; and replace the first word with at least one second word to obtain the disturbance input sample set, a semantic similarity between the second word and the first word being greater than a second preset value.

Optionally, the processor 510 is configured to: determine a word vector of each word in each training input sample; and superimpose a different Gaussian noise vector on the word vector of each word each time to obtain the disturbance sample set.

Optionally, the initial translation model includes an encoder, a classifier and a decoder; the encoder is configured to receive the training input sample and the corresponding disturbance input sample, and output a first intermediate expressed result and a second intermediate expressed result, the first intermediate expressed result being an intermediate expressed result of the training input sample, and the second intermediate expressed result being an intermediate expressed result of the corresponding disturbance input sample; the classifier is configured to distinguish the first intermediate expressed result from the second intermediate expressed result; and the decoder is configured to output the training output sample according to the first intermediate expressed result and output the training output sample according to the second intermediate expressed result.

Optionally, a model target function of the initial translation model includes a classification target function that relates to the classifier and the encoder, and a training target function and a disturbance target function that relate to the encoder and the decoder; the classification target function includes the training input sample, the corresponding disturbance input sample, parameters of the encoder and parameters of the classifier; the training target function includes the training input sample, the training output sample, the parameters of the encoder and parameters of the decoder; and the disturbance target function includes the disturbance input sample, the training output sample, the parameters of the encoder and the parameters of the decoder.

Optionally, the processor 510 is configured to: input each training input sample, the corresponding disturbance input sample, and the corresponding training output sample into the model target function; and optimize the model target function in a manner of gradient descent to determine parameter values of the encoder, parameter values of the decoder and parameter values of the classifier, a parameter gradient of the encoder in the classification target function being multiplied by −1.

Refer to some of the descriptions of FIG. 1 to FIG. 3 for understanding of the foregoing description of the computer device 50. Details are not described herein again.

When the foregoing sentence translation process is executed by using a terminal device, such as a mobile phone, a tablet computer, a personal digital assistant (PDA), a point of sales (POS), or an on-board computer, the terminal device being a mobile phone is used as an example.

Figure 12:
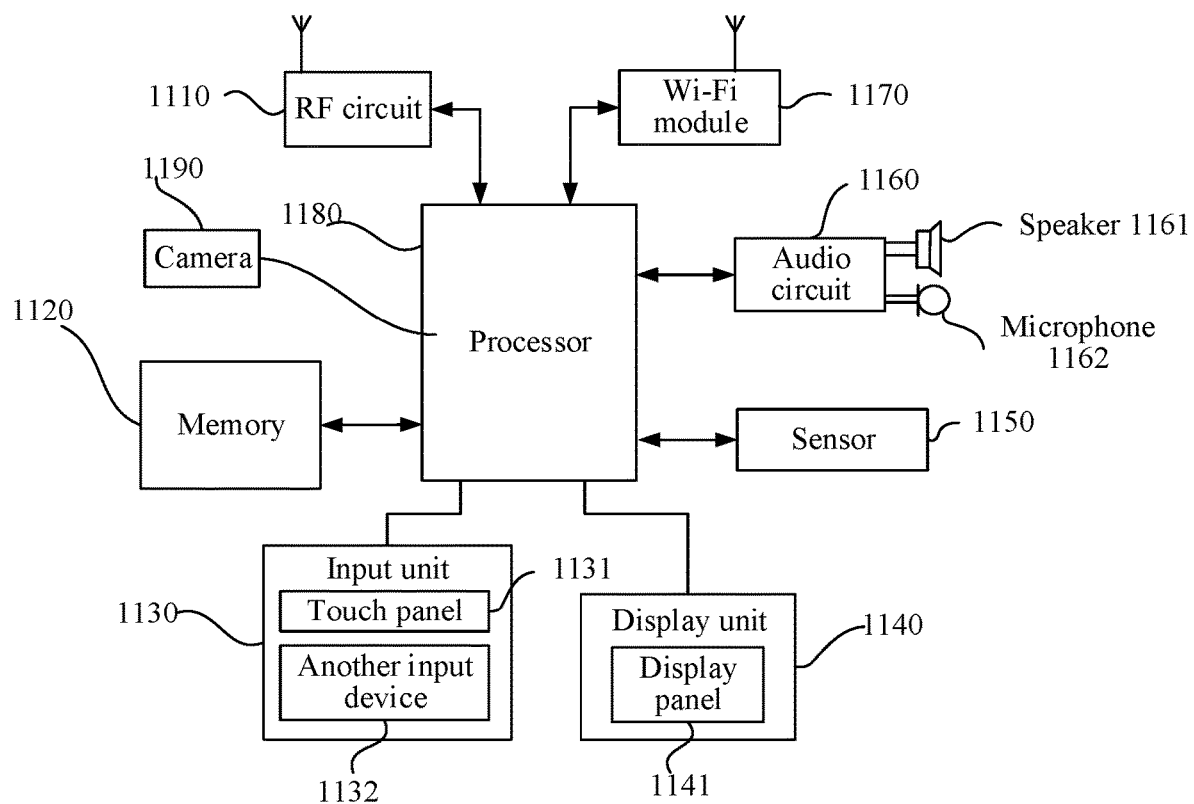
FIG. 12 is a schematic diagram of an embodiment of a terminal device according to an embodiment of the present disclosure.

FIG. 12 is a schematic diagram of an embodiment of a terminal device according to an embodiment of the present disclosure. Description is made below by using the example in which the terminal device is a mobile phone. Referring to FIG. 12, the mobile phone includes components such as: a radio frequency (RF) circuit 1110, a memory 1120, an input unit 1130, a display unit 1140, a sensor 1150, an audio circuit 1160, a wireless fidelity (Wi-Fi) module 1170, a processor 1180, a power supply 1190, and the like. A person skilled in the art may understand that the mobile phone structure shown in FIG. 12 constitutes no limitation on the mobile phone, and the mobile phone may include more or fewer components than those shown in the figure, or some components are combined, or a different component deployment is used.

The following specifically describes the components of the mobile phone with reference to FIG. 12.

The RF circuit 1110 may be configured to receive and send information or receive and send signals during a call. The RF circuit 1110 is a transceiver. Specifically, after downlink information of a base station is received, the downlink information is sent to the processor 1180 for processing. In addition, designed uplink data is sent to the base station. Generally, the RF circuit 1110 includes, but is not limited to, an antenna, at least one amplifier, a transceiver, a coupler, a low noise amplifier (LNA), a duplexer, and the like. In addition, the RF circuit 1110 may further communicate with a network and another device through wireless communication. The wireless communication may use any communications standard or protocol, including but not limited to the global system of mobile communication (GSM), a general packet radio service (GPRS), code division multiple access (CDMA), wideband code division multiple access (WCDMA), Long Term Evolution (LTE), an email, short messaging service (SMS), or the like.

The memory 1120 may be configured to store a software program and a module, and the processor 1180 executes various function applications of the mobile phone and performs data processing by running the software program and the module that are stored in the memory 1120. The memory 1120 may mainly include a program storage area and a data storage area. The program storage area may store an operating system, an application required by at least one function (such as a sound playback function and an image display function), and the like. The data storage area may store data (such as audio data and an address book) created according to use of the mobile phone, and the like. In addition, the memory 1120 may include a high-speed random access memory, and may further include a non-volatile memory such as at least one disk storage device, a flash memory, or another volatile solid-state storage device.

The input unit 1130 may be configured to receive a to-be-translated sentence, or a translation indicator inputted by a user. Specifically, the input unit 1130 may include a touch panel 1131 and another input device 1132. The touch panel 1131, also referred to as a touchscreen, may collect a touch operation of a user on or near the touch panel 1131 (such as an operation of a user on or near the touch panel 1131 by using any suitable object or attachment, such as a finger or a touch pen), and drive a corresponding connection apparatus according to a preset program. Optionally, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and transmits the touch point coordinates to the processor 1180. Moreover, the touch controller can receive and execute a command sent from the processor 1180. In addition, the touch panel 1131 may be implemented by using various types, such as a resistive type, a capacitance type, an infrared type, and a surface acoustic wave type. In addition to the touch panel 1131, the input unit 1130 may further include another input device 1132. Specifically, the another input device 1132 may include, but is not limited to, one or more of a physical keyboard, a functional key (such as a volume control key or a switch key), a track ball, a mouse, and a joystick.

The display unit 1140 may be configured to display a translation result. The display unit 1140 may include a display panel 1141. Optionally, the display panel 1141 may be configured by using a liquid crystal display (LCD), an organic light-emitting diode (OLED), or the like. Further, the touch panel 1131 may cover the display panel 1141. After detecting a touch operation on or near the touch panel 1131, the touch panel 1131 transfers the touch operation to the processor 1180, to determine a type of the touch event. Then, the processor 1180 provides corresponding visual output on the display panel 1141 according to the type of the touch event. Although, in FIG. 12, the touch panel 1131 and the display panel 1141 are used as two separate parts to implement input and output functions of the mobile phone, in some embodiments, the touch panel 1131 and the display panel 1141 may be integrated to implement the input and output functions of the mobile phone.

The mobile phone may further include at least one sensor 1150 such as an optical sensor, a motion sensor, and another sensor. Specifically, the optical sensor may include an ambient light sensor and a proximity sensor. The ambient light sensor may adjust luminance of the display panel 1141 according to brightness of ambient light. The proximity sensor may switch off the display panel 1141 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

An audio circuit 1160, a speaker 1161, and a microphone 1162 may provide an audio interface between the user and the mobile phone. The audio circuit 1160 may convert received audio data into an electric signal and transmit the electric signal to the speaker 1161. The speaker 1161 converts the electric signal into a sound signal for output. On the other hand, the microphone 1162 converts a collected sound signal into an electric signal. The audio circuit 1160 receives the electric signal and converts the electric signal into audio data, and outputs the audio data to the processor 1180 for processing. Then, the processor 1180 sends the audio data to, for example, another mobile phone by using the RF circuit 1110, or outputs the audio data to the memory 1120 for further processing.

Wi-Fi is a short distance wireless transmission technology. The mobile phone may help, by using the Wi-Fi module 1170, a user to receive and transmit an email, browse a web page, access stream media, and the like. This provides wireless broadband Internet access for the user. Although FIG. 12 shows the Wi-Fi module 1170, it may be understood that the Wi-Fi module is not a necessary component of the mobile phone, and when required, the Wi-Fi module may be omitted as long as the scope of the essence of the present disclosure is not changed.

The processor 1180 is the control center of the mobile phone, and is connected to various parts of the mobile phone by using various interfaces and lines. By running or executing the software program and/or module stored in the memory 1120, and invoking data stored in the memory 1120, the processor 1180 performs various functions and data processing of the mobile phone, thereby performing overall monitoring on the mobile phone. Optionally, the processor 1180 may include one or more processing units. Preferably, the processor 1180 may integrate an application processor and a modem. The application processor mainly processes an operating system, a user interface, an application, and the like. The modem mainly processes wireless communication. It may be understood that the modem processor may alternatively not be integrated into the processor 1180.

The camera 1190 is configured to collect an image. The mobile phone further includes the power supply (such as a battery) for supplying power to the components. Preferably, the power supply may be logically connected to the processor 1180 by using a power management system, thereby implementing functions such as charging, discharging and power consumption management by using the power management system.

Although not shown in the figure, the mobile phone may further include a camera, a Bluetooth module, and the like. Details are not described herein.

In the embodiments of the present disclosure, the processor 1180 included in the terminal further has the following control functions: receiving a first to-be-translated sentence expressed in a first language; translating the first to-be-translated sentence by using a target translation model to obtain a translation result sentence expressed in a second language, the target translation model being obtained by training by using a plurality of training samples and a disturbance sample set corresponding to each training sample in the plurality of training samples, the disturbance sample set including at least one disturbance sample, and a semantic similarity between the disturbance sample and the corresponding training sample being greater than a first preset value; and outputting the translation result sentence expressed in the second language.

Optionally, the processor 1180 may further have the following control functions: receiving a second to-be-translated sentence expressed in the first language, the second to-be-translated sentence being a disturbance sentence of the first to-be-translated sentence, and a similarity between the second to-be-translated sentence and the first to-be-translated sentence being greater than the first preset value; translating the second to-be-translated sentence by using the target translation model to obtain the translation result sentence corresponding to the first to-be-translated sentence; and outputting the translation result sentence.

The foregoing embodiments may be all or partially implemented by using software, hardware, firmware or any combination thereof. When software is used for implementation, all or some of the embodiments may be implemented in a form of a computer program product.

The computer program product includes one or more computer instructions. When the computer program instruction is loaded and executed on a computer, all or some of the procedures or functions according to the embodiments of the present disclosure are generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a web site, computer, server, or data center to another web site, computer, server, or data center in a wired (such as a coaxial cable, an optical fiber, or a digital subscriber line (DSL)) or wireless (such as infrared, radio, or microwave or the like) manner. The computer-readable storage medium may be any usable medium that can be stored by a computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid state disk (SSD)), or the like.

A person of ordinary skill in the art may understand that all or some of the steps of the various methods in the foregoing embodiments may be implemented by a program instructing relevant hardware. The program may be stored in a computer-readable storage medium. The storage medium may include a ROM, a RAM, a magnetic disk, an optical disc, or the like.

A translation model training method, a sentence translation method, an apparatus, and a device that are provided in the embodiments of the present disclosure are described above in detail. In the specification, specific examples are used for illustrating principles and implementations of the embodiments of the present disclosure. The foregoing descriptions of the embodiments are merely provided for ease of understanding the present disclosure. Meanwhile, a person of ordinary skill in the art may make modifications to the specific implementations and application scopes according to the idea of the embodiments of the present disclosure. Thus, the specification shall not be construed as a limitation to the embodiments of the present disclosure.

INDUSTRIAL APPLICABILITY

According to the embodiments of the present disclosure, during translation model training, disturbance samples are used. The semantic similarity between the disturbance sample and the training sample is greater than the first preset value, that is, the semantics of the disturbance sample is quite similar to that of the training sample, so that the target translation model trained in this way, when receiving a sentence with noise, can also perform a correct translation. In this way, the robustness of machine translation and the translation quality of machine translation are improved.

What is claimed is:

1. A translation model training method for a computer device, comprising:
   obtaining a training sample set, the training sample set including a plurality of training samples, wherein each training sample is a training sample pair having a training input sample in a first language and a training output sample in a second language;
   determining a disturbance sample set corresponding to each training sample in the training sample set, the disturbance sample set comprising at least one disturbance sample, and a semantic similarity between the disturbance sample and the corresponding training sample being greater than a first preset value, wherein the disturbance sample set includes: a disturbance input sample set corresponding to each training input sample, and a disturbance output sample which is the same as the training output sample; and
   training an initial translation model by using the plurality of training samples and the disturbance sample set corresponding to each training sample to obtain a target translation model, wherein the initial translation model comprises:
      an encoder configured to receive the training input sample from the training sample set and a corresponding disturbance input sample from the disturbance sample set, and output a first intermediate expressed result and a second intermediate expressed result, the first intermediate expressed result being an intermediate expressed result of the training input sample, and the second intermediate expressed result being an intermediate expressed result of the corresponding disturbance input sample;
      a classifier is configured to distinguish the first intermediate expressed result from the second intermediate expressed result, and
      a decoder is configured to output the training output sample according to the first intermediate expressed result and output the training output sample according to the second intermediate expressed result.

2. The method according to claim 1, wherein the disturbance input sample set corresponding to each training input sample in the training sample set is determined by:
   determining a first word in each training input sample, the first word being a to-be-replaced word; and
   replacing the first word with at least one second word to obtain the disturbance input sample set, a semantic similarity between the second word and the first word being greater than a second preset value.

3. The method according to claim 1, wherein the disturbance input sample set corresponding to each training input sample in the training sample set is determined by:
   determining a word vector of each word in each training input sample; and
   superimposing a Gaussian noise vector on the word vector of each word for a plurality of instances, to obtain the disturbance sample set, wherein in each of the plurality of instances, the superimposed Gaussian noise vector is different.

4. The method according to claim 1, wherein:
   a model target function of the initial translation model comprises a classification target function that relates to the classifier and the encoder, and a training target function and a disturbance target function that relate to the encoder and the decoder;
   the classification target function comprises the training input sample, the corresponding disturbance input sample, parameters of the encoder and parameters of the classifier;
   the training target function comprises the training input sample, the training output sample, the parameters of the encoder and parameters of the decoder; and
   the disturbance target function comprises the disturbance input sample, the training output sample, the parameters of the encoder and the parameters of the decoder.

5. The method according to claim 4, wherein the training the initial translation model comprises:
   inputting each training input sample, the corresponding disturbance input sample, and the corresponding training output sample into the model target function; and
   optimizing the model target function in a manner of gradient descent to determine parameter values of the encoder, parameter values of the decoder and parameter values of the classifier, a parameter gradient of the encoder in the classification target function being multiplied by −1.

6. A computer device, comprising:
   at least one memory storing computer program instructions; and
   at least one processor coupled to the at least one memory and, when executing the computer program instructions, configured to perform:
   obtaining a training sample set, the training sample set including a plurality of training samples, wherein each training sample is a training sample pair having a training input sample in a first language and a training output sample in a second language;

determining a disturbance sample set corresponding to each training sample in the training sample set, the disturbance sample set comprising at least one disturbance sample, and a semantic similarity between the disturbance sample and the corresponding training sample being greater than a first preset value, wherein the disturbance sample set includes: a disturbance input sample set corresponding to each training input sample, and a disturbance output sample which is the same as the training output sample; and training an initial translation model by using the plurality of training samples and the disturbance sample set corresponding to each training sample to obtain a target translation model, wherein the initial translation model comprises:

an encoder configured to receive the training input sample from the training sample set and a corresponding disturbance input sample from the disturbance sample set, and output a first intermediate expressed result and a second intermediate expressed result, the first intermediate expressed result being an intermediate expressed result of the training input sample, and the second intermediate expressed result being an intermediate expressed result of the corresponding disturbance input sample;

a classifier is configured to distinguish the first intermediate expressed result from the second intermediate expressed result; and a decoder is configured to output the training output sample according to the first intermediate expressed result and output the training output sample according to the second intermediate expressed result.

7. The computer device according to claim 6, wherein the disturbance input sample set corresponding to each training input sample in the training sample set is determined by:

determining a first word in each training input sample, the first word being a to-be-replaced word; and replacing the first word with at least one second word to obtain the disturbance input sample set, a semantic similarity between the second word and the first word being greater than a second preset value.

8. The computer device according to claim 6, wherein the disturbance input sample set corresponding to each training input sample in the training sample set is determined by:

determining a word vector of each word in each training input sample; and superimposing a Gaussian noise vector on the word vector of each word for a plurality of instances, to obtain the disturbance sample set, wherein in each of the plurality of instances, the superimposed Gaussian noise vector is different.

9. The computer device according to claim 6, wherein:

a model target function of the initial translation model comprises a classification target function that relates to the classifier and the encoder, and a training target function and a disturbance target function that relate to the encoder and the decoder;

the classification target function comprises the training input sample, the corresponding disturbance input sample, parameters of the encoder and parameters of the classifier;

the training target function comprises the training input sample, the training output sample, the parameters of the encoder and parameters of the decoder; and the disturbance target function comprises the disturbance input sample, the training output sample, the parameters of the encoder and the parameters of the decoder.

10. The computer device according to claim 9, wherein the training the initial translation model comprises:

inputting each training input sample, the corresponding disturbance input sample, and the corresponding training output sample into the model target function; and optimizing the model target function in a manner of gradient descent to determine parameter values of the encoder, parameter values of the decoder and parameter values of the classifier, a parameter gradient of the encoder in the classification target function being multiplied by −1.

11. A non-transitory computer-readable storage medium storing computer program instructions executable by at least one processor to perform:

obtaining a training sample set, the training sample set including a plurality of training samples, wherein each training sample is a training sample pair having a training input sample in a first language and a training output sample in a second language;

determining a disturbance sample set corresponding to each training sample in the training sample set, the disturbance sample set comprising at least one disturbance sample, and a semantic similarity between the disturbance sample and the corresponding training sample being greater than a first preset value, wherein the disturbance sample set includes: a disturbance input sample set corresponding to each training input sample, and a disturbance output sample which is the same as the training output sample; and training an initial translation model by using the plurality of training samples and the disturbance sample set corresponding to each training sample to obtain a target translation model, wherein the initial translation model comprises:

an encoder configured to receive the training input sample from the training sample set and a corresponding disturbance input sample from the disturbance sample set, and output a first intermediate expressed result and a second intermediate expressed result, the first intermediate expressed result being an intermediate expressed result of the training input sample, and the second intermediate expressed result being an intermediate expressed result of the corresponding disturbance input sample;

a classifier is configured to distinguish the first intermediate expressed result from the second intermediate expressed result; and a decoder is configured to output the training output sample according to the first intermediate expressed result and output the training output sample according to the second intermediate expressed result.

12. The non-transitory computer-readable storage medium according to claim 11, wherein the disturbance input sample set corresponding to each training input sample in the training sample set is determined by:

determining a first word in each training input sample, the first word being a to-be-replaced word; and replacing the first word with at least one second word to obtain the disturbance input sample set, a semantic similarity between the second word and the first word being greater than a second preset value.

13. The non-transitory computer-readable storage medium according to claim 11, wherein the disturbance input sample set corresponding to each training input sample in the training sample set is determined by:

determining a word vector of each word in each training input sample; and superimposing a Gaussian noise vector on the word vector of each word for a plurality of instances, to obtain the disturbance sample set, wherein in each of the plurality of instances, the superimposed Gaussian noise vector is different.

14. The non-transitory computer-readable storage medium according to claim 11, wherein:

a model target function of the initial translation model comprises a classification target function that relates to the classifier and the encoder, and a training target function and a disturbance target function that relate to the encoder and the decoder;

the classification target function comprises the training input sample, the corresponding disturbance input sample, parameters of the encoder and parameters of the classifier;

the training target function comprises the training input sample, the training output sample, the parameters of the encoder and parameters of the decoder; and the disturbance target function comprises the disturbance input sample, the training output sample, the parameters of the encoder and the parameters of the decoder.

15. The non-transitory computer-readable storage medium according to claim 14, wherein the training the initial translation model comprises:

inputting each training input sample, the corresponding disturbance input sample, and the corresponding training output sample into the model target function; and optimizing the model target function in a manner of gradient descent to determine parameter values of the encoder, parameter values of the decoder and parameter values of the classifier, a parameter gradient of the encoder in the classification target function being multiplied by −1.

* * * * *